March 5, 1935.　　　　F. F. SCHARF　　　　1,993,627
TENDON DRAWING DEVICE
Filed Dec. 30, 1933
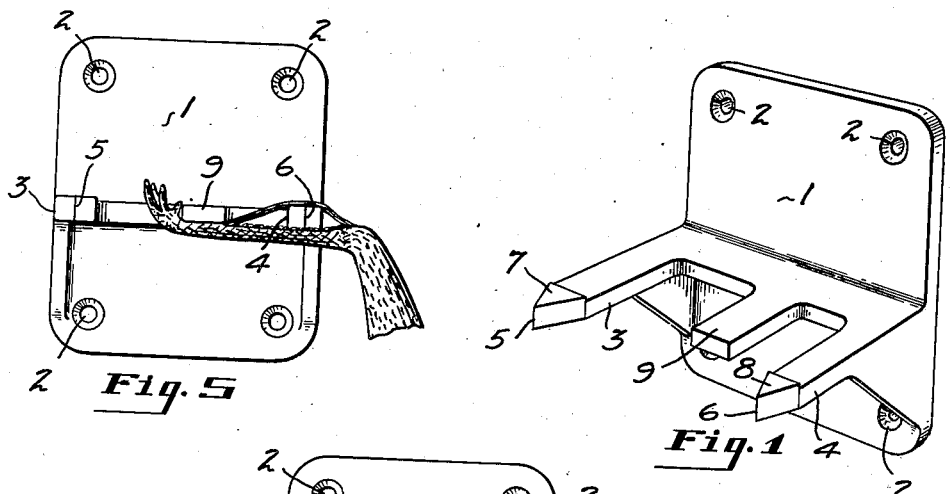
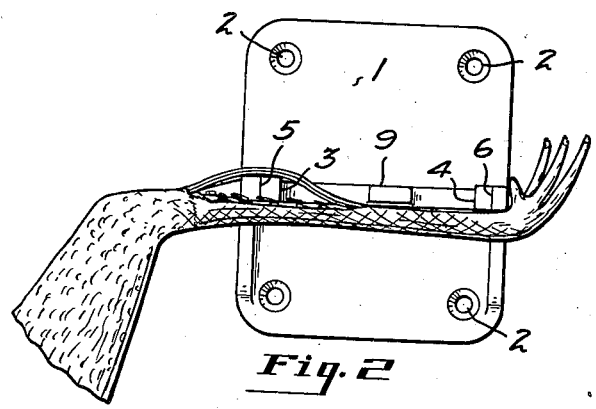
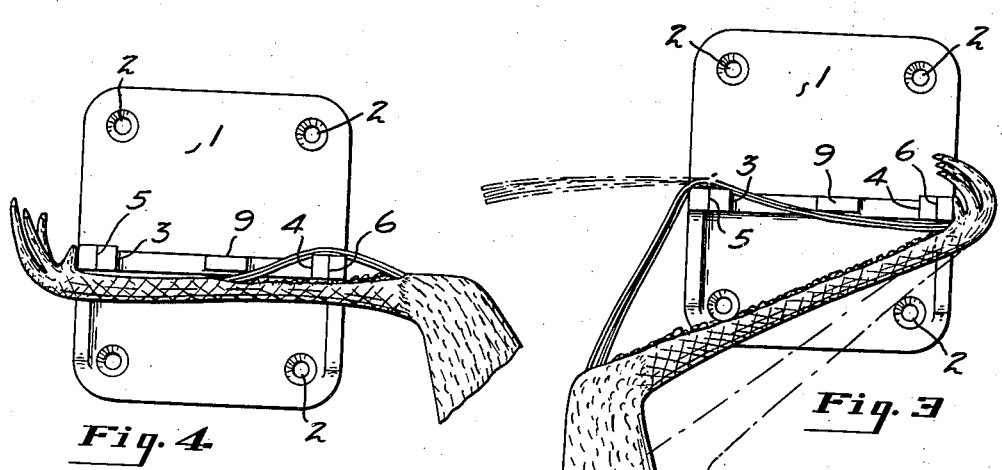
INVENTOR
Frank F. Scharf
BY Frank S. Greene
ATTORNEY Patented Mar. 5, 1935

1,993,627

UNITED STATES PATENT OFFICE 1,993,627

TENDON-DRAWING DEVICE

Frank F. Scharf, Cleveland Heights, Ohio

Application December 30, 1933, Serial No. 704,718

5 Claims. (Cl. 17—11)

This invention relates to a device for drawing the leg tendons of a turkey or other fowls, breaking these tendons away from the upper leg joints and pulling them out from the flesh of the leg.

This invention has for its object to provide a device comprising a projecting prong provided with a sharp point for penetrating the shank of a fowl a short distance below the knee between the bone and the tendons at the rear of the bone, and a projection spaced laterally with respect to the prong beneath which the foot of a fowl may be placed after the shank has been penetrated by the prong and which serves as a fulcrum about which the shank of the fowl will swing when a downward pull or jerk is applied to the body of the fowl.

A further object is to provide a device comprising spaced prongs, each adapted to serve either as a shank penetrating prong or as a fulcrum so that the leg from which the tendons are being pulled may be the leg on the side of the fowl adjacent the wall, one prong being used to penetrate the left shank of the fowl and the other the right shank.

A further object is to provide a device comprising a pair of prongs adapted to serve, one as a shank penetrating prong and the other as a fulcrum about which the shank bone of the fowl has a lever action, the prongs being spaced apart a sufficient distance to enable the tendons to be entirely stripped from a leg of a turkey or other large fowls by a single downward movement of the body of the fowl with one prong acting as a tendon puller and the other as a fulcrum, and having an intermediate projection which provides a fulcrum for the shanks of smaller fowls such as chickens or ducks.

With the above and other objects in view, the invention may be said to comprise the device as illustrated in the accompanying drawing hereinafter described and particularly set forth in the appended claims, together with such variations and modifications thereof which will be apparent to one skilled in the art to which the invention appertains.

Reference should be had to the accompanying drawing forming a part of this specification, in which Figure 1 is a perspective view showing a device in the form of a wall bracket embodying the invention;

Fig. 2 is a front elevation showing the right leg of a fowl in tendon pulling position, the shank being pierced by the left hand prong of the bracket and the foot being positioned beneath the right hand prong.

Fig. 3 is a view corresponding to Fig. 2 showing the shank swung down to near the end of the tendon pulling movement;

Fig. 4 is a view similar to Fig. 2 showing the left shank of a fowl impaled by the right prong of the device and engaged beneath the opposite prong;

Fig. 5 is a view showing the shank of a smaller fowl impaled on one of the prongs and engaged beneath the intermediate projection.

Referring to the accompanying drawing, the device of the present invention is adapted for attachment to the face of a wall and has a flat back plate 1 adapted to be rigidly secured to a wall by suitable means such as screws through holes 2. Integral prongs 3 and 4 project from the face of the back plate 1. These prongs are preferably rectangular in cross section and terminate at their outer end in vertically disposed knife edges 5 and 6. The prongs have raised portions 7 and 8 at their outer ends each of which serves to retain on the prong the shank of the fowl which has been penetrated.

In using the device the leg of a fowl is held in vertical position and preferably with the fowl so positioned that the leg so held is on the side of the body toward the wall. While either prong can be used to impale either shank of a fowl the left hand prong 3 is preferably used to impale the right shank and the right hand prong 4 to impale the left shank. The shank held in vertical position is brought into engagement with the knife edge 5 of the prong 3 between the bone and tendons a short distance below the knee joint. To facilitate the insertion of the point of the prong into the shank, the shank may be inclined at a slight angle and drawn over a corner of the knife edge to slit the skin and permit the knife edge to enter between the bone and tendon, or the shank may be rocked slightly back and forth as it is pushed against the prong. The knife edge will readily enter between the tendons and the bone and will pry the tendons out away from the bone as the shank is forced onto the prong. After the right shank of a fowl has been impaled on the prong 3, the pierced shank is swung to the right and the foot portion thereof is placed beneath the prong 4. The body of the fowl then hangs vertically down from the knee joint and is suspended from the prong 3 by the tendons. The operator then grasps the depending portion of the leg close to the knee joint and applies a downward jerk. The horizontally positioned shank fulcrums about the prong 4, and, as the fowl is pulled downwardly and to the right the tendons, which extend over the top of the prong 3, are broken away from the joint and pulled completely out of the flesh of the leg. The pull on the tendons during the downward movement of the body of the fowl acts upon the toes to which the tendons are attached, pulling the toes inwardly toward the prong 4 as shown in Fig. 3, so that the foot of the fowl hooked over the outer side of the prong 4 is held tightly by the pull of the tendons against the outer face of the prong 4, anchoring the shank to the prong 4 upon which it fulcrums during the tendon pulling operation.

To strip the tendons from the left leg of the fowl, the body of the fowl is reversed and the left shank is penetrated by the prong 4. The shank is then swung downwardly and engaged under the prong 3, whereupon the tendons are extracted by pulling the body of the fowl down and to the right.

As herein shown, the prongs 3 and 4 are spaced apart a distance sufficient to permit complete extraction of the tendons of a large fowl such as a turkey by a single downward movement of the body after the shank has been pierced by one prong and the foot has been placed beneath the other.

The prongs 3 and 4 are, however, too far apart to permit engagement of the foot of a smaller fowl such as a chicken or duck beneath the second prong. The bracket is, therefore, provided with a central projection 9 against which the foot of a fowl whose shank is too short to reach the opposite prong will engage.

It is, of course, possible to use the same prong to impale first the right and then the left shank of a fowl but it is much more convenient, especially for the larger fowl, to utilize one prong for the right shank and the other prong for the left shank.

It will be apparent that the present invention provides a means of quickly and easily extracting the tendons from the leg of a fowl, providing means adapted to pierce either leg of the fowl and for supporting the fowl with its body hanging vertically from the knee joint and with the shank bone positioned to act as a lever fulcruming about a point adjacent the foot so that the tendons are completely freed from the leg by a single movement.

What I claim is:

1. A device for drawing the leg tendons of fowls comprising a projecting prong upon which a shank of a fowl may be impaled with the prong adjacent the knee joint and between the bone and the leg tendons, and a projecting element spaced laterally of the prong a distance such as to provide an abutment beneath which the impaled shank may be engaged immediately adjacent its foot, so that the foot will project upwardly in retaining engagement with said projecting element, the body of the fowl will be suspended by the tendons from said prong and the impaled shank will act as a lever fulcruming about the foot engaging said projection upon a downward pull on the body of the fowl.

2. A device for drawing the leg tendons of fowls comprising a pair of laterally spaced prongs upon either of which a shank of a fowl may be impaled with the prong adjacent the knee joint and between the bone and the leg tendons, said prongs being spaced apart a distance such that the shank impaled on one prong may be engaged beneath the other prong immediately adjacent its foot, so that the body of the fowl will be suspended from the impaling prong by the tendons and the impaled shank will act as a lever fulcruming about the foot engaging the other prong upon a downward pull on the body of the fowl.

3. A device for drawing the leg tendons of fowls comprising a bracket having a back plate adapted to be secured to a wall, and a pair of laterally spaced prongs projecting from said back plate, upon either of which a shank of a fowl may be impaled, said prongs being spaced apart a distance such that one prong may impale the shank adjacent the knee joint between the bone and tendons and the foot portion of the impaled shank may be placed beneath the other prong whereby the body of the fowl is suspended by the tendons from the impaling prong and the impaled shank will act as a lever fulcruming about the foot engaging the other prong upon a downward pull on the body of the fowl.

4. A device for drawing the leg tendons of fowls comprising a bracket having a back plate adapted to be secured to a wall, a pair of laterally spaced prongs projecting from said back plate, upon either of which a shank of a fowl may be impaled, said prongs being spaced apart a distance such that one prong may impale the shank adjacent the knee joint between the bone and tendons and the foot portion of the impaled shank may be placed beneath the other prong whereby the body of the fowl is suspended by the tendons from the impaling prong and the impaled shank will act as a lever fulcruming about the foot engaging the other prong upon a downward pull on the body of the fowl, and a projection intermediate said prongs to provide a fulcruming abutment for the feet of smaller fowls having legs of insufficient length to span the space between the prongs.

5. The herein described method of extracting tendons from the leg of a fowl which comprises engaging the foot of said leg with a fixed member, swinging the shank of the fowl about said fixed member as a fulcrum while restraining the tendons at a point adjacent the knee joint against movement with said shank.

FRANK F. SCHARF.